United States Patent
Van Vleck et al.

(10) Patent No.: US 7,746,884 B2
(45) Date of Patent: Jun. 29, 2010

(54) COMMUNICATIONS GATEWAY AND METHOD OF USING THE SAME

(75) Inventors: Paul Van Vleck, Austin, TX (US); Ahmad C. Ansari, Cedar Park, TX (US); Vernon Daniel Reed, Austin, TX (US); David Bruce Hartman, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 937 days.

(21) Appl. No.: 11/102,464

(22) Filed: Apr. 8, 2005

(65) Prior Publication Data

US 2006/0251094 A1    Nov. 9, 2006

(51) Int. Cl.
*H04L 12/28* (2006.01)
*H04N 7/173* (2006.01)
(52) U.S. Cl. .................... 370/419; 725/110
(58) Field of Classification Search ............... 370/419
See application file for complete search history.

(56) References Cited

U.S. PATENT DOCUMENTS

| | | | |
|---|---|---|---|
| 6,038,303 A * | 3/2000 | Sanford et al. | 379/201.01 |
| 6,526,581 B1 * | 2/2003 | Edson | 725/111 |
| 7,007,296 B2 * | 2/2006 | Rakib | 725/111 |
| 7,254,110 B2 * | 8/2007 | Wissing et al. | 370/218 |
| 2002/0059638 A1 * | 5/2002 | Oz et al. | 725/129 |
| 2004/0172657 A1 * | 9/2004 | Phillips et al. | 725/110 |
| 2005/0129069 A1 * | 6/2005 | Binder | 370/493 |
| 2006/0050688 A1 * | 3/2006 | Panagopoulos et al. | 370/356 |

* cited by examiner

*Primary Examiner*—Daniel J Ryman
*Assistant Examiner*—John Blanton
(74) *Attorney, Agent, or Firm*—Toler Law Group

(57) ABSTRACT

A communications gateway can be used to provide communications services from a communications service provide to electronic devices within a structure. Signals can be transmitted from the communications gateways to the electronic devices over a plurality of different types of wireline media. The communications gateway can allow communication services using a wireline medium (e.g., a set of twisted pair wires) to be transmitted within the structure by taking advantage of existing wireline media (e.g., CAT3 cable, coaxial cable, power lines, etc.).

7 Claims, 8 Drawing Sheets

COMMUNICATIONS GATEWAY AND METHOD OF USING THE SAME

BACKGROUND

1. Field of the Disclosure

The present disclosure relates to communications gateways, and more particularly to communications gateways and methods of using communications gateways.

2. Description of the Related Art

Communications gateways, such as residential gateways or multimedia gateways, are commonly used for providing Internet or cable access within a structure (e.g., a house, an office building, etc.) or a portion thereof (e.g., an apartment unit within an apartment building). In one embodiment, a coaxial cable can be received at a house and split into a first coaxial cable line that is directed to a set-top box for broadcast programs, a second cable line that is directed to a personal computer for Internet access, and still another line that is directed to an analog telephone (via an adapter). Not all structures have access to services by cable companies. In remote locations, laying coaxial cable for a structure that is over a kilometer away from the nearest house can be quite expensive. Therefore, even though new structures may be internally wired for a plurality of communications media (e.g., telephone, coaxial cables, and CAT5 cable), those new structures may not be able to receive cable service.

Satellite or other wireless media may be used to provide communication services to remote locations. However, satellite and other wireless media can have significantly slower transmission rates, tend to have fluctuations in the quality of service (e.g., because of environmental conditions, e.g., thunderstorms, solar storms, or improperly shielded equipment operating nearly), or a combination thereof. Therefore, although satellite or other wireless media can be used, wireline communications may be preferred.

Within the United States, nearly every structure occupied by humans for a significant portion of most days has one or more telephone lines provided to such structure or portion thereof (e.g., a house, an office building, an apartment, etc.). Within the structure, a plurality of different types of wireline media (e.g., CAT3 cable, coaxial cable, etc.) within the walls of the structure is commonly used to transmit signals from communications service providers throughout portions of the structure. A wireless router can be connected to a wireline medium; however, the wireless transmission using the wireless router may be subject to some of the problems seen with satellites or other wireless medium. Also, the wireless connections may have transmission problems within a structure if a significant amount of metal (e.g., furnace, water heater, etc.), a relatively dense material (e.g., brick, stone, or other masonry), or a significant distance lies between the wireless router and a personal computer or other device that is to be connected to the wireless router.

Figure 1:
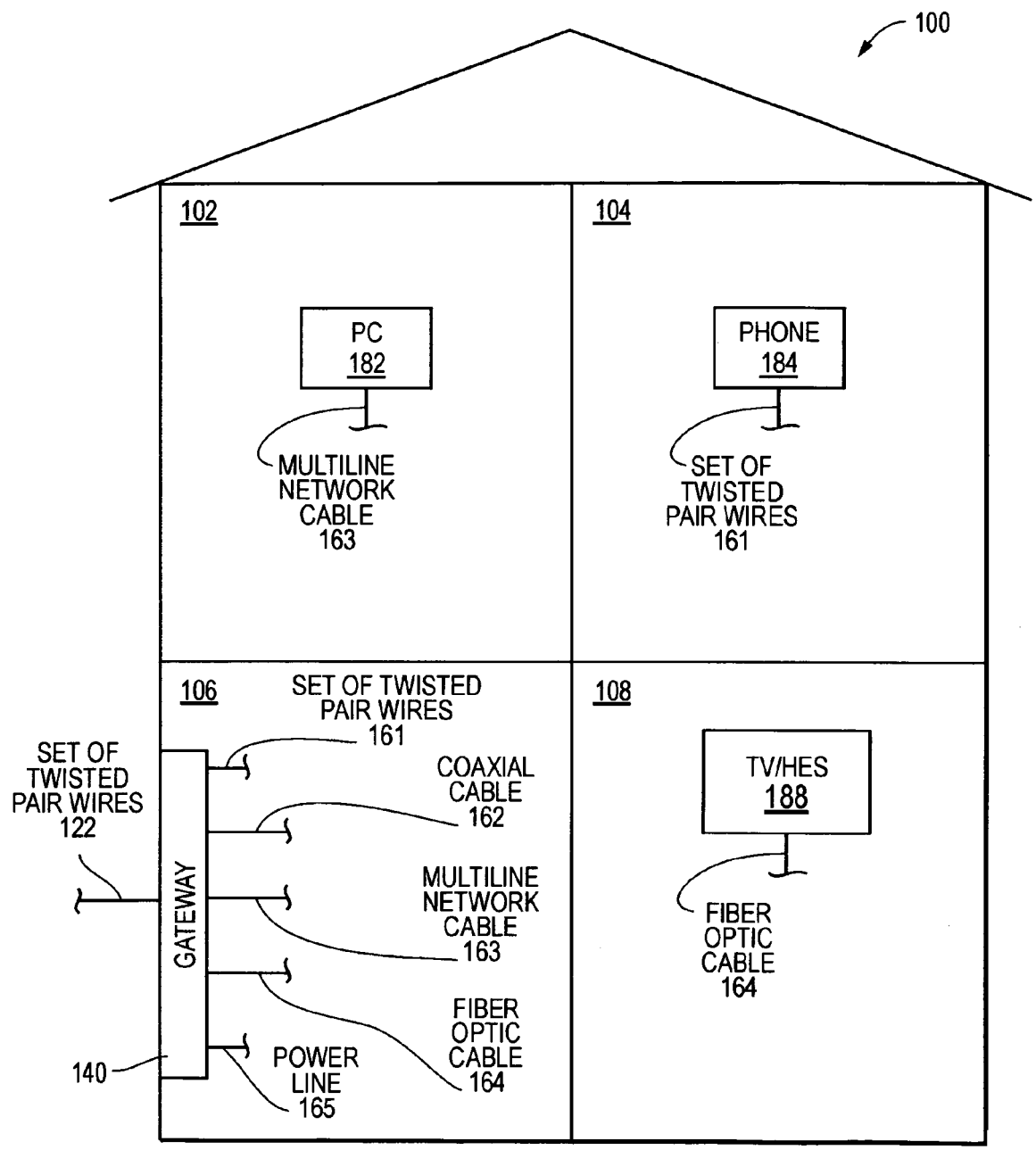
FIG. 1 includes a block diagram of a structure with a communications gateway in accordance with an embodiment.

Skilled artisans appreciate that elements in the figures are illustrated for simplicity and clarity and have not necessarily been drawn to scale.

DETAILED DESCRIPTION

A communications gateway can be used to provide communications services from a communications service provide to electronic devices within a structure. Signals can be transmitted from the communications gateways to the electronic devices over a plurality of different types of wireline media. The communications gateway can allow communication services using a wireline medium (e.g., a set of twisted pair wires) to be transmitted within the structure by taking advantage of existing wireline medium (e.g., CAT3 cable, coaxial cable, power lines, etc.). The ability of use existing wireline medium can substantially prevent the likelihood of requiring significant changes to structural components (e.g., walls, floors, beams, etc.) within the structure. The wireline medium can allow for higher quality transmission of signals within a structure as compared to wireless connections.

In a first aspect, a method of using a communications gateway can include receiving a first signal at the communications gateway over a first set of twisted-pair wires and transmitting a second signal over a first wireline medium that is routed through a first structural component of a structure. The method can also include receiving a third signal at the communications gateway over the first set of twisted-pair wires and transmitting a fourth signal over a second wireline medium that is routed through a second structural component of the structure, wherein the second wireline medium is a different media type from the first wireline medium.

In one embodiment of the first aspect, each of the first wireline medium and second wireline medium is selected from a group consisting of a second set of twisted-pair wires, a coaxial cable, a multi-line network cable, a fiber optic cable, a power line, and any combination thereof. In another embodiment, the first signal includes an analog signal. In a particular embodiment, the first wireline medium is a second set of twisted-pair wires. In another particular embodiment, the second signal includes a digital signal. In another embodiment, the second signal is the same as or corresponds to the first signal, and the fourth signal is the same as or corresponds to the third signal.

In a second aspect, a communications gateway can include a first input/output port configured to receive a first set of twisted-pair wires, wherein the first set of twisted-pair wires is coupled to a communications service provider remote from the first input/output port. The communications gateway can also include a second input/output port configured to receive a first wireline medium, wherein the first wireline medium is routed through a first structural component of a structure and is coupled to one or more devices within a structure. The communications gateway can also include a third input/output port configured to receive a second wireline medium, wherein the second wireline medium is routed through a second structural component of the structure and is coupled to the one or more devices within the structure, and wherein the second wireline medium is a different media type from the first wireline medium.

In one embodiment of the second aspect, the communications gateway further includes a fourth input/output port configured to receive a third wireline medium, wherein the third wireline medium is coupled to the one or more devices within the premises, and wherein the third wireline medium is a different media type from each of the first wireline medium and second wireline medium. In another embodiment, each of the first and the second wireline media is selected from a group consisting of a second set of twisted-pair wires, a coaxial cable, a multi-line network cable, a fiber optic cable, a power line, and any combination thereof.

In still another embodiment of the second aspect, the first wireline medium is a second set of twisted-pair wires. In a particular embodiment, the communications gateway further includes an analog telephone adapter coupled to the first wireline medium. In a more particular embodiment, the communications gateway further includes a switch that is configured, such that the first wireline medium can be selectively coupled to the analog telephone adapter or to another line.

In yet another embodiment of the second aspect, the communications gateway further includes a modem positioned to receive a signal from the first input/output port before the signal is routed over the second wireline medium, the third wireline medium, or both. In a particular embodiment, the communications gateway further includes a firewall module to reduce the likelihood of malicious signals from being forwarded to the first wireline medium, the second wireline medium, or both. In another particular embodiment, the communications gateway further includes a coaxial cable adapter coupled to the second wireline medium. The second wireline medium is a coaxial cable, and the coaxial cable adapter is configured to receive a first signal from the modem and to send a second signal, corresponding to the first signal, over the second wireline medium. In a more particular embodiment, the communications gateway further includes a combining module coupled to the first wireline medium and to the coaxial cable adapter.

In still another particular embodiment of the second aspect, the communications gateway further includes a fiber optic cable adapter coupled to the second wireline medium. The second wireline medium is a fiber optic cable, and the fiber optic cable adapter is configured to receive a first signal from the modem and send a second signal, corresponding to the first signal, over the second wireline medium. In yet another particular embodiment, the communications gateway further includes a power line adapter coupled to the second wireline medium. The second wireline medium is a power line, and the power line adapter is configured to receive a first signal from the modem and to send a second signal, corresponding to the first signal, over the second wireline medium.

In yet another embodiment of the second aspect, the communications gateway further includes a filter module to filter signals received at the first input/output port.

In a third aspect, a method of using a communications gateway can include receiving a first signal at the communications gateway over a first fiber optic cable and transmitting a second signal over a first wireline medium that is routed through a first structural component of a structure. The method can also include receiving a third signal at the communications gateway over the first fiber optic cable and transmitting the fourth signal over a second wireline medium that is routed through a second structural component of the structure, wherein the second wireline medium is a different media type from the first wireline medium.

In one embodiment of the third aspect, each of the first wireline medium and second wireline medium is selected from a group consisting of a set of twisted-pair wires, a coaxial cable, a multi-line network cable, a second fiber optic cable, a power line, and any combination thereof. In another embodiment, the method further includes converting the first signal to generate the second signal. The first signal is a digital signal, and the second signal is an analog signal. In a particular embodiment, the first wireline medium is a second set of twisted-pair wires. In another particular embodiment, the third signal includes a digital signal.

In still another embodiment of the third aspect, the first wireline medium is a coaxial cable. In yet another embodiment, the second signal is the same as or corresponds to the first signal, and the fourth signal is the same as or corresponds to the third signal In a fourth aspect, a communications gateway can include a first input/output port configured to receive a first fiber optic cable, wherein the first fiber optic cable is coupled to a communications service provider remote from the first input/output port. The communications gateway can also include a second input/output port configured to receive a first wireline medium, wherein the first wireline medium is routed through a first structural component of a structure and is coupled to one or more devices within a structure. The communications gateway can further include a third input/output port configured to receive to a second wireline medium, wherein the second wireline medium is routed through a second structural component of the structure and is coupled to the one or more devices within the structure, and wherein the second wireline medium is a different media type from the first wireline medium.

In one embodiment of the fourth aspect, the first wireline medium is a set of twisted-pair wires. In another embodiment, the communications gateway further includes a coaxial cable adapter coupled to the second wireline medium. The second wireline medium is a coaxial cable, and the coaxial cable adapter is configured to receive a first signal from the modem and send a second signal, corresponding to the first signal, over the second wireline medium. In still another embodiment, the communications gateway further includes a power line adapter coupled to the second wireline medium. The second wireline medium is a power line, and the power line adapter is configured to receive a first signal from the modem and send a second signal, corresponding to the first signal, over the second wireline medium.

In a fifth aspect, a method can be used to communicate with a device within a structure. The method can include receiving a configuration signal at a broadband access unit. The configuration signal can originate from a source remote to the structure. The broadband access unit is associated with a structure and located external to the structure. The method can also include changing a configuration of the broadband access unit based at least in part on the configuration signal.

In one embodiment of the fifth aspect, the configuration signal can be received from a controller at a central office. In another embodiment, changing the configuration can includes activating a network interface to the network interface device or deactivating the network interface to the network interface device.

In a sixth aspect, a broadband access unit including an access module, a routing and switching module coupled to the access module, and a network interface. The network interface can be coupled to the access module, the routing and switching module, or a combination thereof, wherein the network interface includes a first input/output port configured to receive a first wireline medium, the first input/output port coupled to a network interface device that is located external to a structure to which the network interface device is associated.

In one embodiment of the sixth aspect, the broadband access unit further includes a second network interface coupled to the access module, the routing and switching module, or a combination thereof. The second network interface can include a second input/output port configured to receive a second wireline medium, the second input/output port coupled to a second network interface device that is located external to the structure to which the second network interface device is associated. The second wireline medium is a different media type from the first wireline medium. In another embodiment, the broadband access unit can further include a third input/output port coupled to the access module and configured to receive a third wireline medium, the third input/output port coupled to a broadband access service provider.

Before addressing details of embodiments described below, some terms are defined or clarified. The term "wireline medium" is intended to mean a physical medium used for transmitting signals (e.g., voice signals, video signals, analog signals, data signals, etc.). An example of a wireline medium includes a wire, a cable, a set of wires or cables, a fiber optic cable, a power line, another suitable transmission line, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, for clarity purposes and to give a general sense of the scope of the embodiments described herein, the use of "a" or "an" are employed to describe one or more articles to which "a" or "an" refers. Therefore, the description should be read to include at least one whenever "a" or "an" is used, and the singular also includes the plural unless it is clear that the contrary is meant otherwise.

Unless stated otherwise, any combination of parts of a system may be bi-directionally or uni-directionally coupled to each other, even though a figure may illustrate only a single-headed arrow or a double-headed arrow. Arrows within the drawing are illustrated, as a matter of convenience, to show a principal information, data, or signal flow within the system or between the system and one or more components outside the system, one or more modules outside the system, another system, or any combination thereof in accordance with an embodiment. Coupling should be construed to include a direct electrical connection in one embodiment and alternatively, may include any one or more of an intervening switch, resistor, capacitor, inductor, router, firewall, network fabric or the like between any combination of one or more components, one or more devices, or one or more modules.

Unless otherwise defined, technical and scientific terms used herein have the same meaning as commonly understood by one of ordinary skill in the art. In addition, the methods and examples disclosed are illustrative only and not intended to be limiting.

FIG. 1 includes an illustration of a subscriber line, over which a communications service provider (remote to a structure 100) can provide communications services to the structure 100. The structure 100 can be a house, an apartment building, an office building, another suitable structure, or portion thereof (e.g., an apartment unit, a floor of an office building), or any combination thereof. The structure 100 includes rooms 102, 104, 106, and 108. More or fewer rooms may be present within the structure 100. In one embodiment, the subscriber line is a set of twisted-pair wires 122, such as a conventional telephone line, that is located adjacent to an exterior wall of the structure 100. A communications gateway 140 is coupled to the set of twisted-pair wires 122. The communications gateway 140 can be a residential gateway, a multimedia gateway, another suitable communications gateway, or any combination thereof used for providing communications services to electronic devices within the structure 100 via the subscriber line.

In one embodiment, the communications gateway 140 may be located within the room 106, which could be a garage, a store room, a facilities room, or other room within the structure 100. In still another embodiment (not illustrated), the communications gateway 140 can be mounted outside of the structure 100 or at another location outside but near the structure 100. The actual location of the communications gateway 140 is not critical to the implementation of this embodiment. The communications gateway 140 may be designed to take into account whether the communications gateway 140 will be located outside of a structure, inside an unheated and uncooled garage, or within an environmentally controlled room (e.g., temperature in a range of approximately 20-25° C., a relative humidity in a range of approximately 30-50%, other controlled ambient condition, or any combination thereof).

The communications gateway 140 is coupled to one or more wireline media, wherein such wireline media is routed through structural member (e.g., walls, floors, beams, or other structural components (e.g., masonry)) of the structure 100. As used in this specification, routing through a structural component does not include routing through a doorway or a window. The wireline media can include a set of twisted-pair wires 161 (e.g. CAT3 cable), a coaxial cable 162, a multiline network cable 163 (e.g., CAT5 cable, ribbon cable, or the like), a fiber optic cable 164, a power line 165 (e.g., an AC power line), another suitable transmission line, or any combination thereof. Throughout the structure 100, any combination of the wireline media may have been originally installed in the structure 100 when the structure 100 was built, when the structure 100 was previously remodeled, or any combination thereof. Typically, routing the wireline medium through a structural component can involve cutting holes through a wall, floor, beam, or any combination thereof. In one particular embodiment, one or more of the wireline medium may be routed between wallboards (e.g., sheet rock, paneling, etc.) of two immediately adjacent rooms. This embodiment takes advantage of such pre-existing wireline medium already installed or being installed within the walls or other structural components of the structure 100. Thus, walls and other structural components within the structure 100 do not need to be significantly modified solely for use with the communications gateway 140. By using existing wireline medium within the structure 100, the cost to implement the communications gateway 140 is significantly reduced.

The set of twisted-pair wires 161, the coaxial cable 162, the multiline network cable 163, the fiber optic cable 164, the power line 165, another suitable transmission line, or any combination thereof can be routed to rooms 102, 104, 106, or 108, another room within the structure 100, or any combination thereof. In the embodiment as illustrated in FIG. 1, the multiline network cable 163 is routed from the gateway 140 to room 102 and is coupled to a personal computer ("PC") 182, the set of twisted-pair wires 161 is routed from the communications gateway 140 to room 104 and is coupled to a phone 184, and the fiber optic cable 164 is routed to room 108 and is coupled to a television/home entertainment system ("TV/HES") 188.

The multiline network cable 163 may or may not be a single continuous cable extending the entire length from the communications gateway 140 to the PC 182 within room 102. Connectors, splitters, combining modules, routers, switches, or other hardware, firmware, software or the like may lie between the personal computer 182 and the communications gateway 140. Thus, a plurality of multiline cables may lie between the communications gateway 140 and the PC 182. However such hardware does not significantly affect the signal as output by the communications gateway 140 and received by the PC 182, or vice versa. Similarly the set of twisted-pair wires 161 (routed to room 104), the fiber optic cable 164 (routed to room 108), coaxial cable 162, power line 165, other signal transmission lines, or any combination thereof may be a single article or may include a plurality of similar articles that are connected with hardware, firmware, or software as described with respect to the multiline network cable 163.

Figure 2:
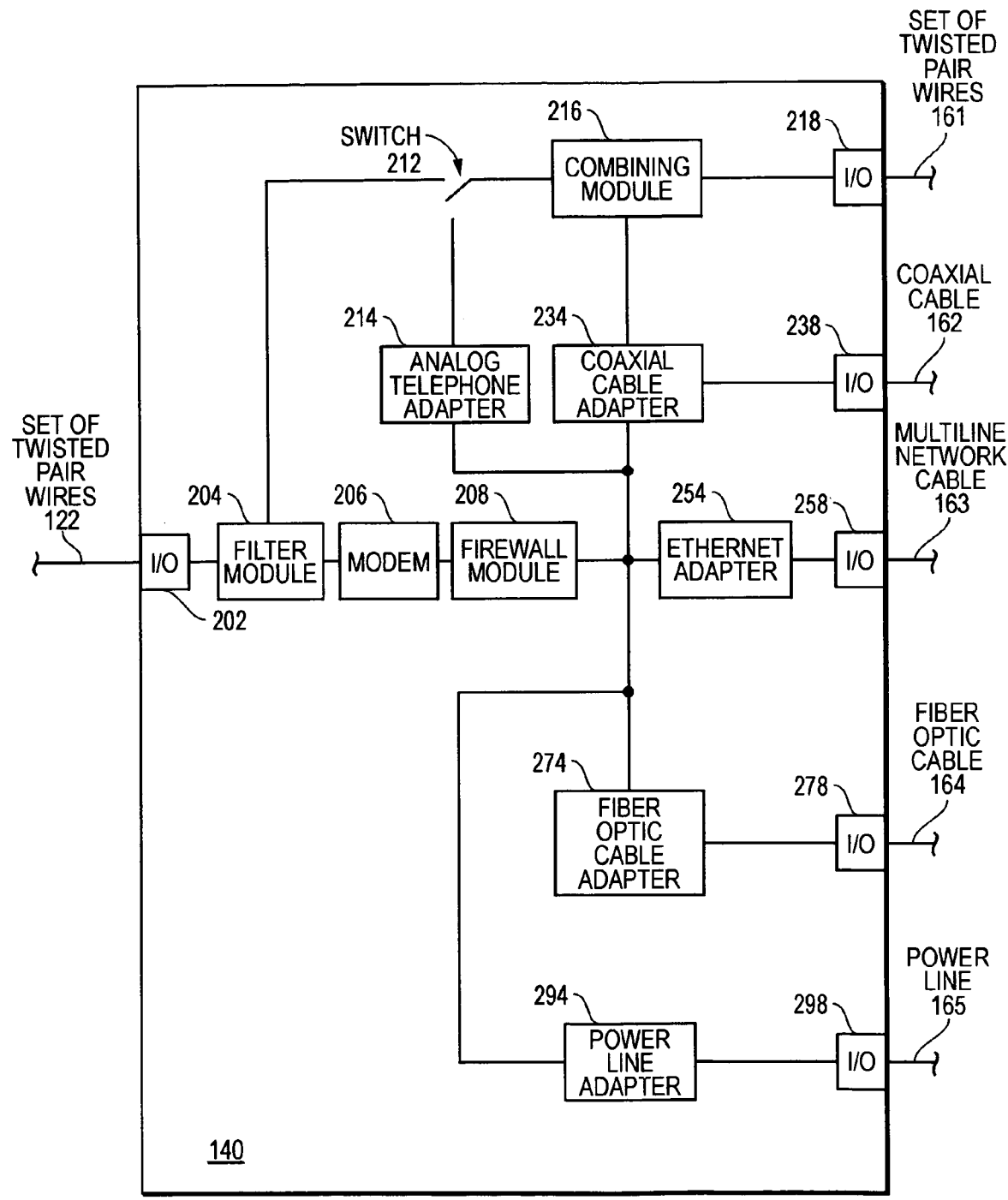
FIG. 2 includes a block diagram of a particular embodiment of the communications gateway of FIG. 1.

An exemplary, non-limiting embodiment, the communications gateway 140 is illustrated in FIG. 2. An input/output ("I/O") port 202 of the communications gateway 140 is configured to receive the set of twisted-pair wires 122. The I/O port 202 is coupled to a filter module 204 that is configured to remove noise or other undesired signals received from the set of twisted-pair wires 122. In the embodiment as illustrated in FIG. 2, the filter module 204 is coupled to a switch 212 that is coupled to a combining module 216 coupled to an I/O port 218. The I/O port 218 is configured to receive the set of twisted-pair wires 161. In a particular embodiment, when the position of the switch 212 connects the filter module 204 to the combining module 216, voice signals from the set of twisted-pair wires 122 can be routed via the communications gateway 140 to the set of twisted-pair wires 161 which is coupled to the phone 184, which in one embodiment is a Voice over Internet Protocol ("VoIP")-enabled telephone.

The filter module 204 is also coupled to a modem 206 that is coupled to a firewall module 208. In one embodiment, the firewall module 208 is coupled to an analog telephone adapter 214. The analog telephone adapter 214 can be used to separate voice signals from a combination of voice and data signals that may arrive at the communications gateway 140 via the set of twisted-pair wires 122. The other position of the switch 212 connects the analog telephone adapter 214 to the combining module 216. Voice signals can be routed to an analog telephone via the I/O port 218 and the set of twisted-pair wires 161.

A coaxial cable adapter 234 is coupled to the firewall module 208. The coaxial cable adapter 234 can include a Multimedia Over Cable Alliance ("MoCA") or a Home Phoneline Networking Alliance ("HPNA") 3.0 adapter. In one embodiment, the coaxial cable adapter 234 can be used to separate voice signals from other data signals, such as video streams, wherein the voice signals are routed to the combining module 216, and the data signals are routed to an I/O port 238 that is configured to receive the coaxial cable 162.

An Ethernet adapter 254 is coupled to the firewall module 208. The Ethernet adapter 254 is coupled an I/O port 258 that is configured to receive the multiline network cable 163. A fiber optic cable adapter 274 is coupled to the firewall module 208. The fiber optic cable adapter 274 can be used to convert electronic signals to optical signals. The fiber optic cable adapter 274 is coupled to an I/O port 278 that is configured to receive the fiber optic cable 164. A power line adapter 294 is coupled to the firewall module 208. The power line adapter 294, such as HomePlug™ brand adapter can be coupled to an I/O port 298 that is configured to receive the power line 165.

After reading this specification, skilled artisans will appreciate that the communications gateway 140 can be used for unidirectional and bi-directions communications between electronic devices within the structure 100 and other electronic devices (not illustrated) that are communicatively coupled to the set of twisted-pair wires 122 outside the structure 100. An example of a uni-directional communication can include a broadcast program that can be viewed on the TV/HES 188 within room 108. An example of a bi-directional communication can include a telephone call using the phone 184 within room 104 or browsing the Internet using the PC 182 within room 102.

Many alternate embodiments exist for the communications gateway 140. If the number of I/O ports is reduced, the number of internal components and routing can be simplified. For example, if signals are not to be transmitted over the power line 165, the communications gateway 140 may still receive a power line 165 but its function would be limited to providing power to the components for operating the communications gateway 140 and not used as a wireline medium for transmitting voice, data, or other signals from the communications gateway 140 to rooms within the structure 100. Similarly, the fiber optic cable adapter 274 and the I/O port 278 can be eliminated if the fiber optic cable 164 is not present, and the Ethernet adapter 254 and the I/O port 258 can be eliminated if the multiline network cable 163 is not present.

In another embodiment, the switch 212 and the analog telephone adapter 214 are not needed if phones coupled to the communications gateway 140 are VoIP-enabled telephones. In one particular embodiment, when the switch 212 and analog telephone adapter 214 are not present within the communications gateway 140, the filter module 204 can be electrically connected to the I/O port 218. In still another embodiment, the combining module 216 may not be required. In this embodiment, voice signals are separated from data signals before reaching the coaxial cable adapter 234. The voice signals can be routed from the filter 204 to the I/O port 218, and the data signals pass through the modem 206, the firewall 208, and the coaxial cable adapter 234 to the I/O port 238. In a further embodiment, the filter module 204, the firewall module 208, or both are not required. However, in practical applications, the use of the filter module 204, the firewall module 208, or both are desirable.

After reading this specification, skilled artisans will appreciate that one or more other wireline media can be connected to the communications gateway 140. In the future, other wireline communication media may be developed and may allow for the use of such wireline media when used in conjunction with the communications gateway 140. In still a further embodiment, wireless connections may be used at ends of the wireline media. For example, a wireline medium may be used to route signals to and from electronic devices within a room within the structure 100. Within a room, the wireline medium may be connected to a wireless transmitter, receiver, or transceiver capable of communicating with one or more electronic devices within the room, thus allowing for the use of a pico net within such room.

The communications gateway 140 can include a central processing unit ("CPU"), not illustrated. The CPU is an example of a data processing system. Although not shown, other connections and memories may reside in or be coupled to the CPU or other portion of the communications gateway 140. Such memories can include a hard disk, content addressable memory, static random access memory, cache, first-in-first-out ("FIFO"), other memories, or any combination thereof. The memories can include media that can be read by the CPU. Therefore, each of the types of memory includes a data processing system readable medium.

Portions of the methods described herein may be implemented in suitable software code for carrying out the methods described. In one embodiment, the computer-executable instructions may be lines of assembly code or compiled $C^{++}$, Java, or other language code. In another embodiment, the code may be contained on a data storage device, such as a hard disk, magnetic tape, floppy diskette, optical storage device, networked storage device(s), or other appropriate data processing system readable medium or storage device.

Functions preformed by any one or more of the modules may be combined with one or more other modules or the CPU. For example, the modem 206 and the firewall module 208 may be combined into a single module. Additionally, any one or more of the modules may be embodied in another portion of the communications gateway 140. In still another embodiment, one or more of the modules may be located outside of the communications gateway 140. For example, the analog telephone adapter 214 may be located within room 104 at a point where it would be closer to the phone 184. Also, any single module may be embedded within a plurality of integrated circuits, chip sets, circuit boards, or the like. Additionally, a software program or its software components with such code may be embodied in more than one data processing system readable medium in more than one computer or other item having a CPU.

Figure 3:
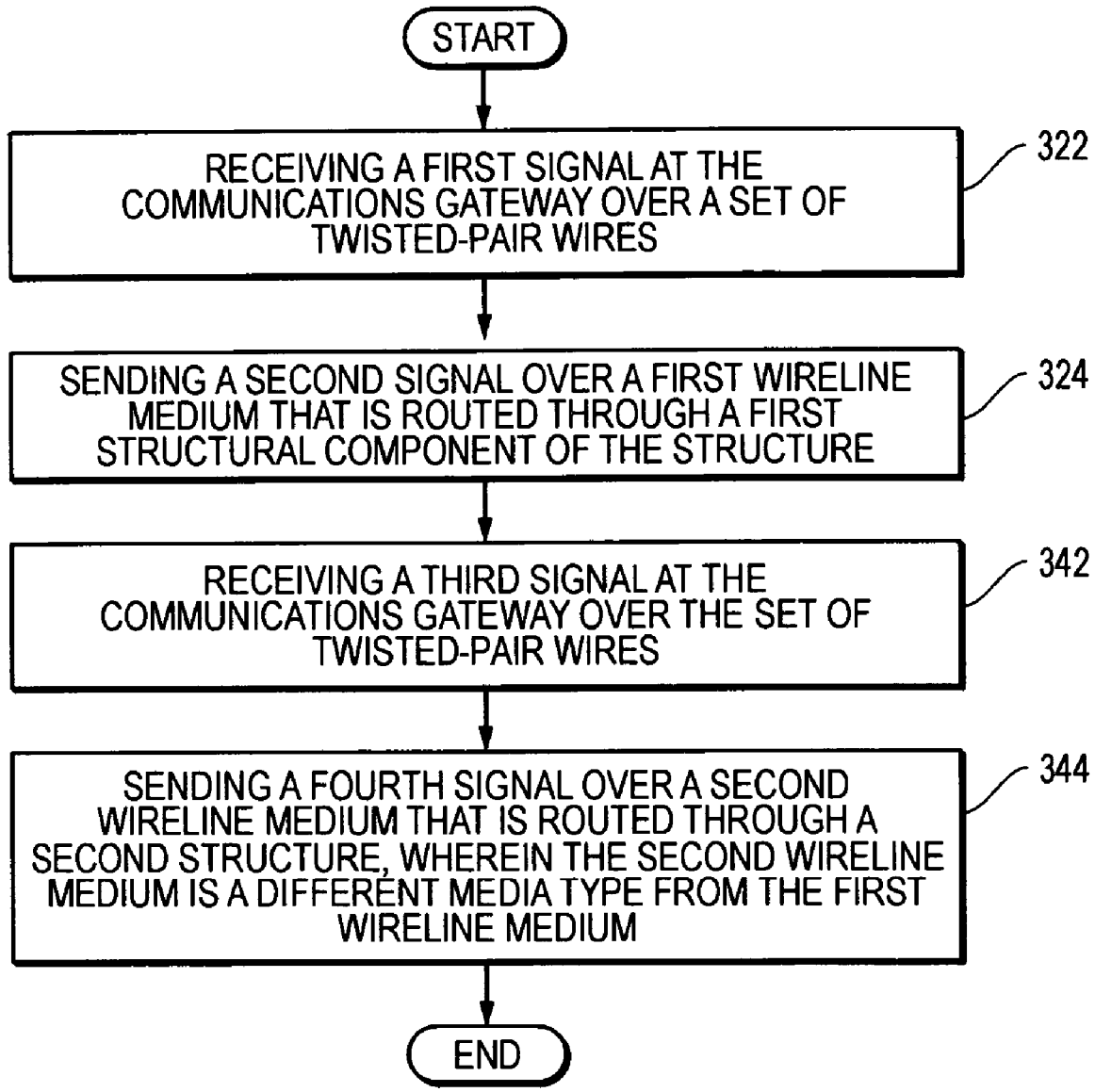
FIG. 3 includes a flow diagram of a method of using the communications gateway of FIG. 2.

Attention is now directed toward a method of using the communications gateway 140 in accordance with an embodiment, as illustrated in FIG. 3. The method can include receiving a first signal at the communications gateway 140 over a set of twisted-pair wires 122, such as the twisted pair at block 322. The method can include transmitting a second signal over a first wireline medium that is routed through a first structural component of the structure 100, at block 324. For example, an incoming telephone call can be received at the structure 100 over the set of twisted-pair wires 122. In one embodiment, the incoming telephone call can be in the form of analog signals. The incoming telephone call can be received by the communications gateway 140 at the I/O port 202 and routed through the filter module 204, the modem 206, the firewall module 208, the analog telephone adapter 214, the switch 212, the combining module 216, and the I/O port 218 to the set of twisted-pair wires 161. The incoming telephone call can be transmitted over the set of twisted-pair wires 161 to the phone 184 within room 104. Note that the first signal and the second signal may be the same signal or the second signal can correspond to the first signal. In this particular embodiment, the phone 184 can be an analog telephone coupled to the set of twisted-pair wires 161.

The method can further include receiving a third signal at the communications gateway 140 over a set of twisted-pair wires 122, such as the twisted pair, as shown at block 342. The method can still further include transmitting a fourth signal over a second wireline medium that is routed through a second structural component of the structure 100, wherein the second wireline medium is a different media type from the first wireline medium, at block 344. The second structural component may be the same as or different from the first structural component. In one embodiment, the third signal can be a digital video signal that is received by the communications gateway 140 at the I/O port 202 and routed through the filter module 204, the modem 206, the firewall module 208, the fiber optic cable adapter 274, and the I/O port 278 to the fiber optic cable 164. The video signal can be transmitted over the fiber optic cable 164 to the TV/HES 188 within room 108. Note that the third signal and the fourth signal may be the same signal or the fourth signal can correspond to the third signal. In this particular embodiment, the third signal is an electronic signal, and the fourth signal is an optical signal.

The embodiment, as illustrated by the method in FIG. 3, allows for different types of signals to be routed by the communications gateway 140 over different types of existing wireline media within the structure 100. Voice signals can be routed to phones using traditional CAT3 cable for telephone systems, and data signals can use a different type of wireline medium (e.g., the fiber optic cable 164) for video or other signals in order to take advantage of a higher transmission rate for the fiber optic cable 164 as compared to the set of twisted pair wires 161, such as conventional CAT3 cable. In other embodiments, one or more other wireline media (e.g., the coaxial cable 162, the multiline network cable 163, the power line 165, or any combination thereof) may be used in place of or in conjunction with the set of twisted-pair wires 161 and the fiber optic cable 164 as described with respect to FIG. 3.

Embodiments described herein can allow transmission of signals within the structure 100 by using the existing wireline media within the structure 100. Holes or other openings through existing structural components (e.g., walls, beams, masonry, etc.) are not required. Also, the time and cost of performing such structural changes may be obviated by using the existing wiring. Most homes and offices within the United States have telephone lines that run to their associated structures. The cost of installing and supporting a costly new wireline medium (e.g., coaxial cable), particularly to remotely located houses or other structures can be avoided. Therefore, conventional telephone lines can be used to provide a variety of phone, Internet, and entertainment services, while allowing for different types of wireline media to be used in routing services within the home.

Figure 4:
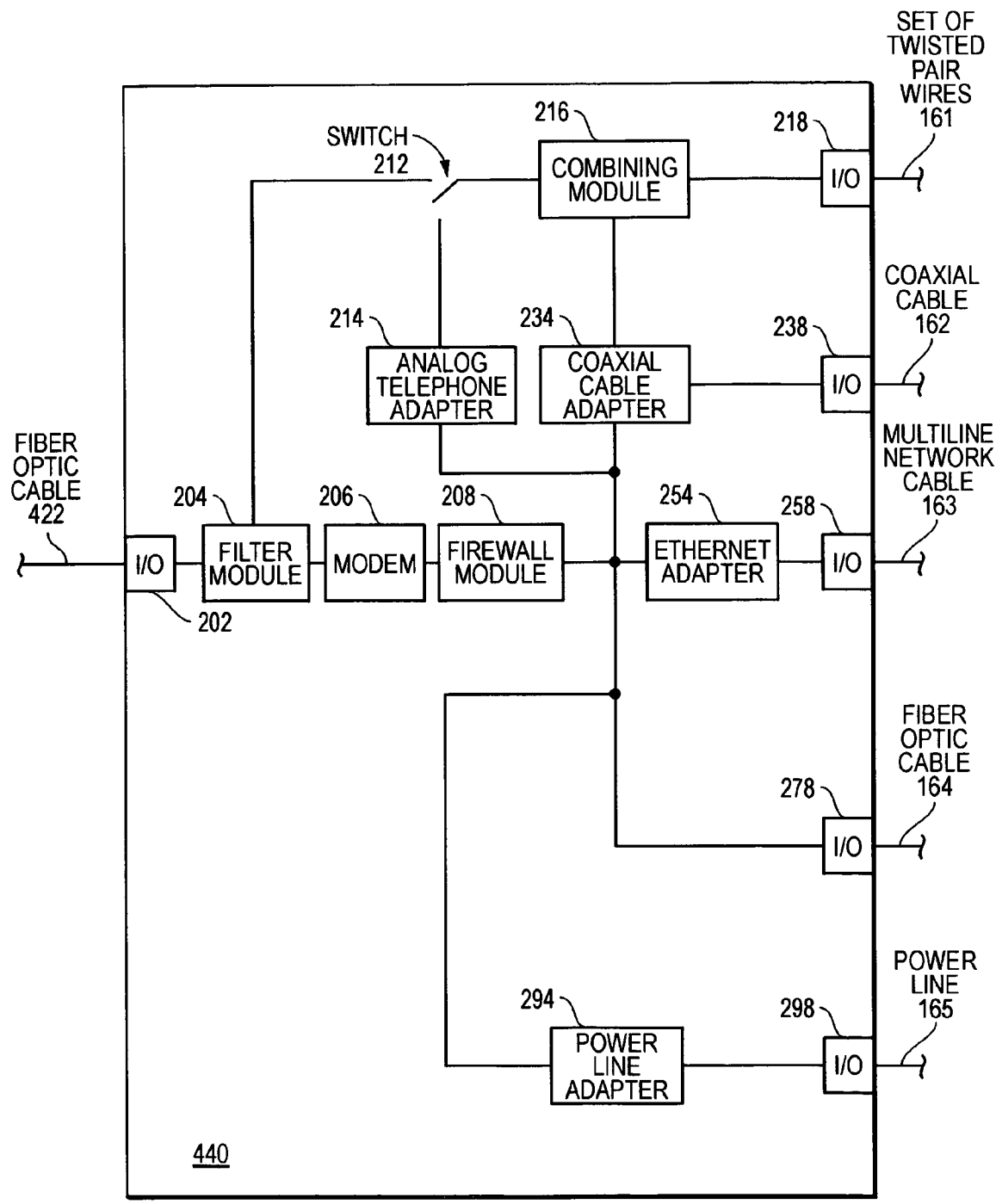
FIG. 4 includes a block diagram of the communications gateway in accordance with an alternative embodiment.

The embodiments previously described can be modified to replace the set of twisted-pair wires 122 in the communications gateway 140 with a fiber optic cable 422 within a communications gateway 440, as illustrated in FIG. 4. In this embodiment, some or all of the components with the communications gateway 440 may be the same or different from the corresponding components within the communications gateway 140. For example, in one embodiment, the fiber optic cable adapter 274 would not be needed because signals from the fiber optic cable 422 are optical signals.

Alternatively, the optical signals from the fiber optic cable 422 may be converted to electronic signals by an optical to electrical converter disposed between the I/O port 202 and the filter module 204, so that conventional electronic components can be used within the communications gateway 440. In this particular embodiment, the fiber optic cable adapter 274 may be used between the firewall module 208 and the I/O port 278 to convert electronic signals reaching the fiber optic cable adapter 274 back to optical signals.

Figure 5:
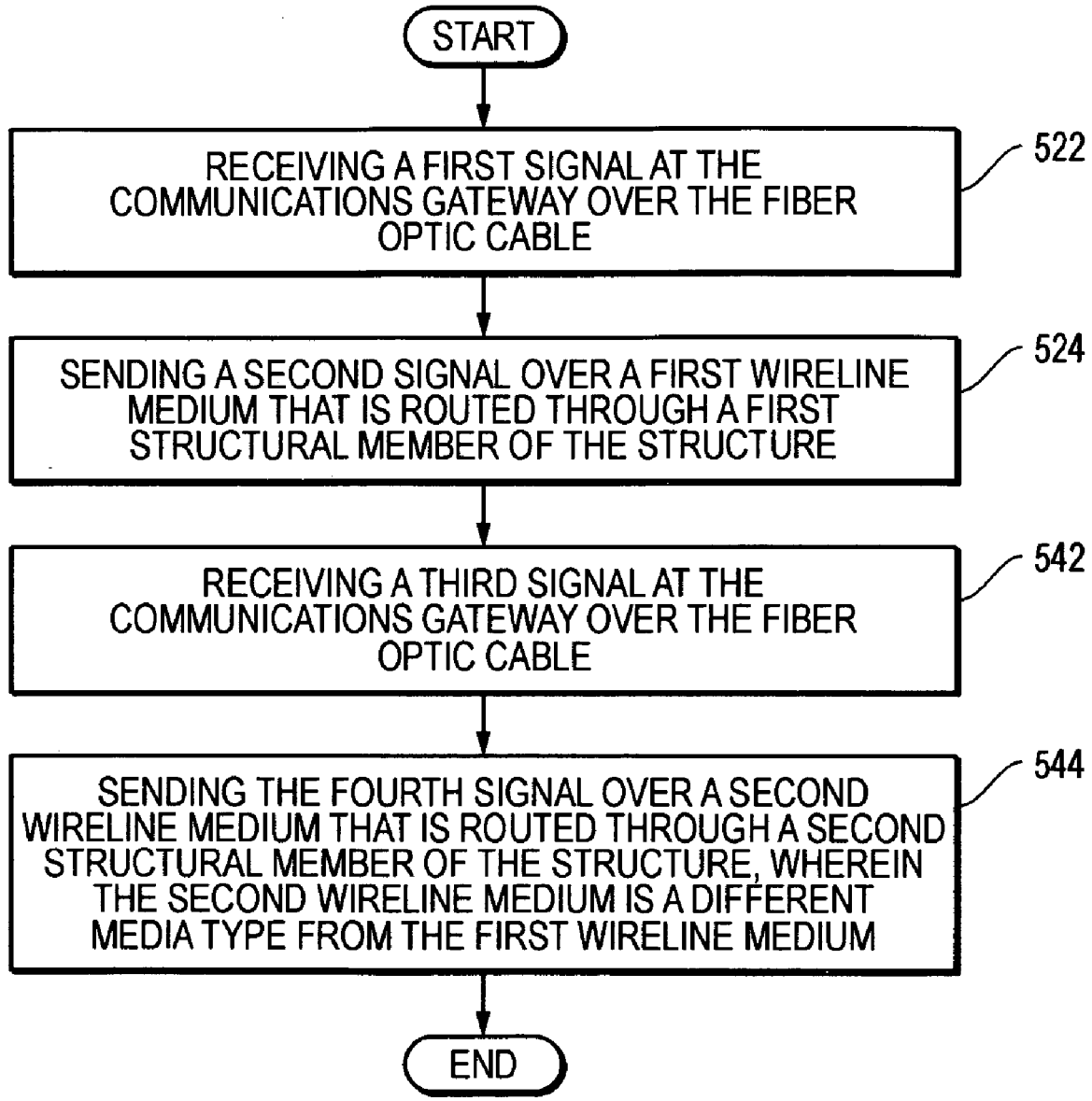
FIG. 5 includes a flow diagram of a method of using the communications gateway of FIG. 4.

A method of using the communications gateway 440 in accordance with an embodiment is illustrated in FIG. 5. The method can include receiving a first signal at the communications gateway 440 over a fiber optic cable, as shown at block 522. The method can also include transmitting a second signal over a first wireline medium that is routed through a first structural component of the structure 100 (block 524). For example, a web page may have been requested by a user at the PC 182 within room 102. In response, the requested web page can be received at the structure 100 over the fiber optic cable 422. The requested web page can be received by the communications gateway 440 at the I/O port 202 and routed through the filter module 204, the modem 206, the firewall module 208, the Ethernet adapter 234, and the I/O port 238 to the multiline network cable 163 (e.g., CAT5 cable). The requested web page can be transmitted over the multiline network cable 163 to the PC 182 within room 102, where the requested web page can be rendered and displayed to the user. Note that the first signal and the second signal may be the same signal or the second signal can correspond to the first signal. In this particular embodiment, the first signal is an optical signal, and the second signal is an electronic signal.

The method can further include receiving a third signal at the communications gateway 440 over a fiber optic cable, such as the fiber cable 422, at block 542. The method can still further include transmitting a fourth signal over a second wireline medium that is routed through a second structural component of the structure 100, wherein the second wireline medium is a different media type from the first wireline medium at block 544. The second structural component may be the same as or different from the first structural component. In one embodiment, the third signal can be a video signal that is received by the communications gateway 440 at the I/O port 202 and routed through the filter module 204, the modem 206, the firewall module 208, the cable modem adapter 234, and the I/O port 228 to the coaxial cable 162. The video signal can be transmitted over the coaxial cable 162 to the TV/HES 188 within room 108. Note that the third signal and the fourth signal may be the same signal or the fourth signal can correspond to the third signal.

In another embodiment, a broadband access unit ("BAU") can be installed outside the structure 100, such as on an exterior wall of the structure, on a utility pole near the structure, or the like. The BAU can include interfaces for technologies, such as MoCA to allow the BAU to distribute Internet Protocol ("IP") traffic throughout a structure (e.g., a house, an office, etc.) over existing coaxial networks, and HPNA V3 interfaces to allow the BAU to transport and distribute Internet Protocol traffic over existing twisted pair wiring.

Figure 6:
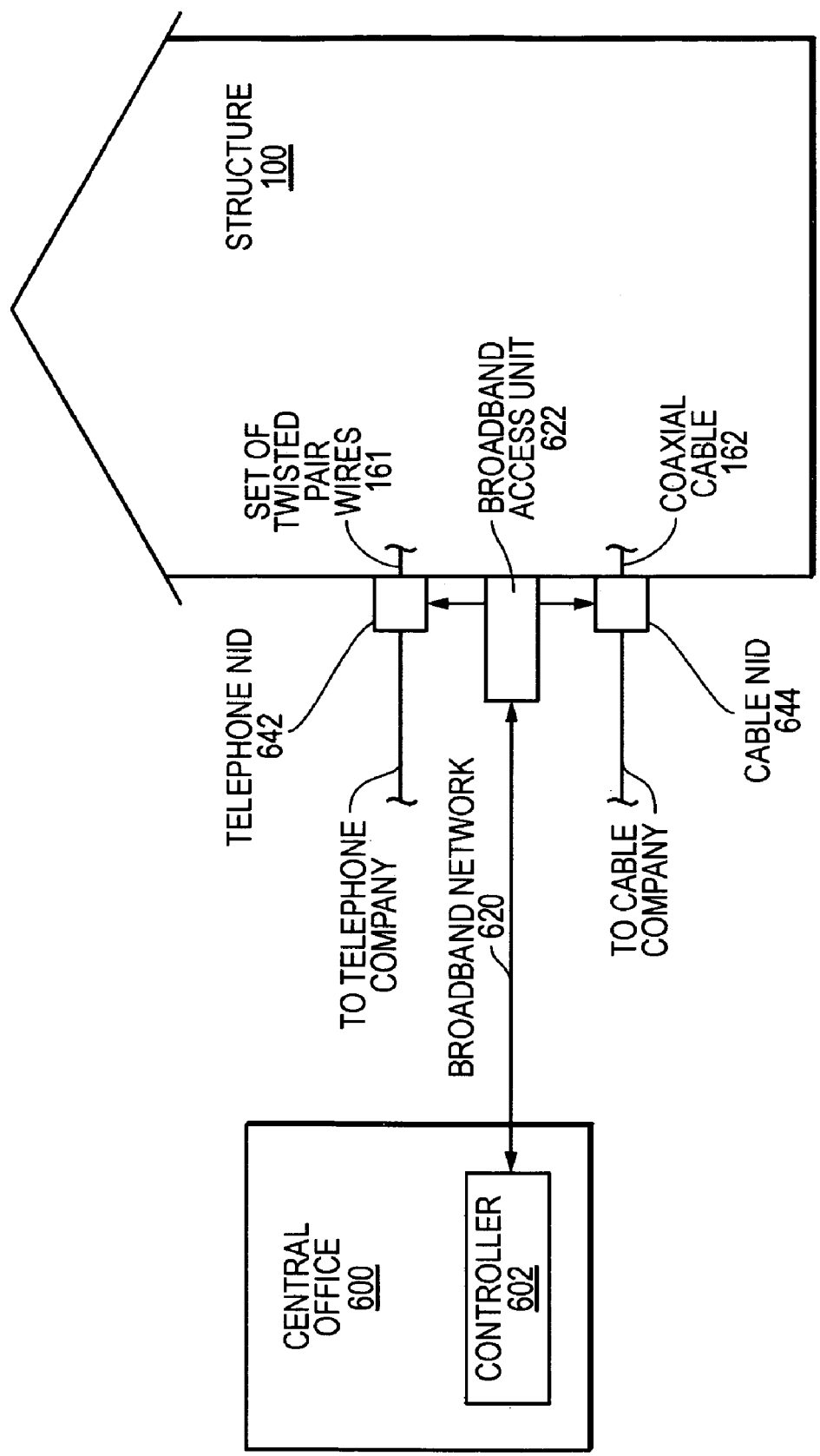
FIG. 6 includes a block diagram of a broadband access unit externally located to its associated structure.

FIG. 6 includes a diagram illustrating a BAU 622 and its relationship to the structure 100 and a central office 600 of a broadband access provider. The central office 600 includes a controller 602, which may reside within a computer or other data processing system that can be used to control the flow of data to and from the structure via the broadband network 620. The controller 602 may also be used to make configuration changes in the BAU 622, as described herein. The broadband network 620 can include a set of twisted pair wires, coaxial cable, multiline network cable, fiber optic cable, other suitable broadband transmission medium, or any combination thereof.

The BAU 622 can be bi-directionally coupled to a telephone network interface device (NID) 642, a cable NID 644, another transmitting medium NID, or any combination thereof. The telephone NID 642 may also be coupled to a telephone line that is operated by a telephone company, and the cable NID 644 may also be coupled to a coaxial cable line that is operated by a cable company. The telephone NID 642 can be coupled to one or more sets of twisted pair wires 161 that can be routed through structural components within the structure to one or more rooms within the structure 100. The cable NID 644 can be coupled to one or more sets of coaxial cables 162 that can be routed through structural components within the structure to one or more rooms within the structure 100. Other NIDs, not illustrated, can be coupled to one or more sets other transmission media (e.g., one or more multiline network cables, one or more fiber optic cables, one or more power lines, or any combination thereof) that can be routed through structural components within the structure to one or more rooms within the structure 100.

Figure 7:
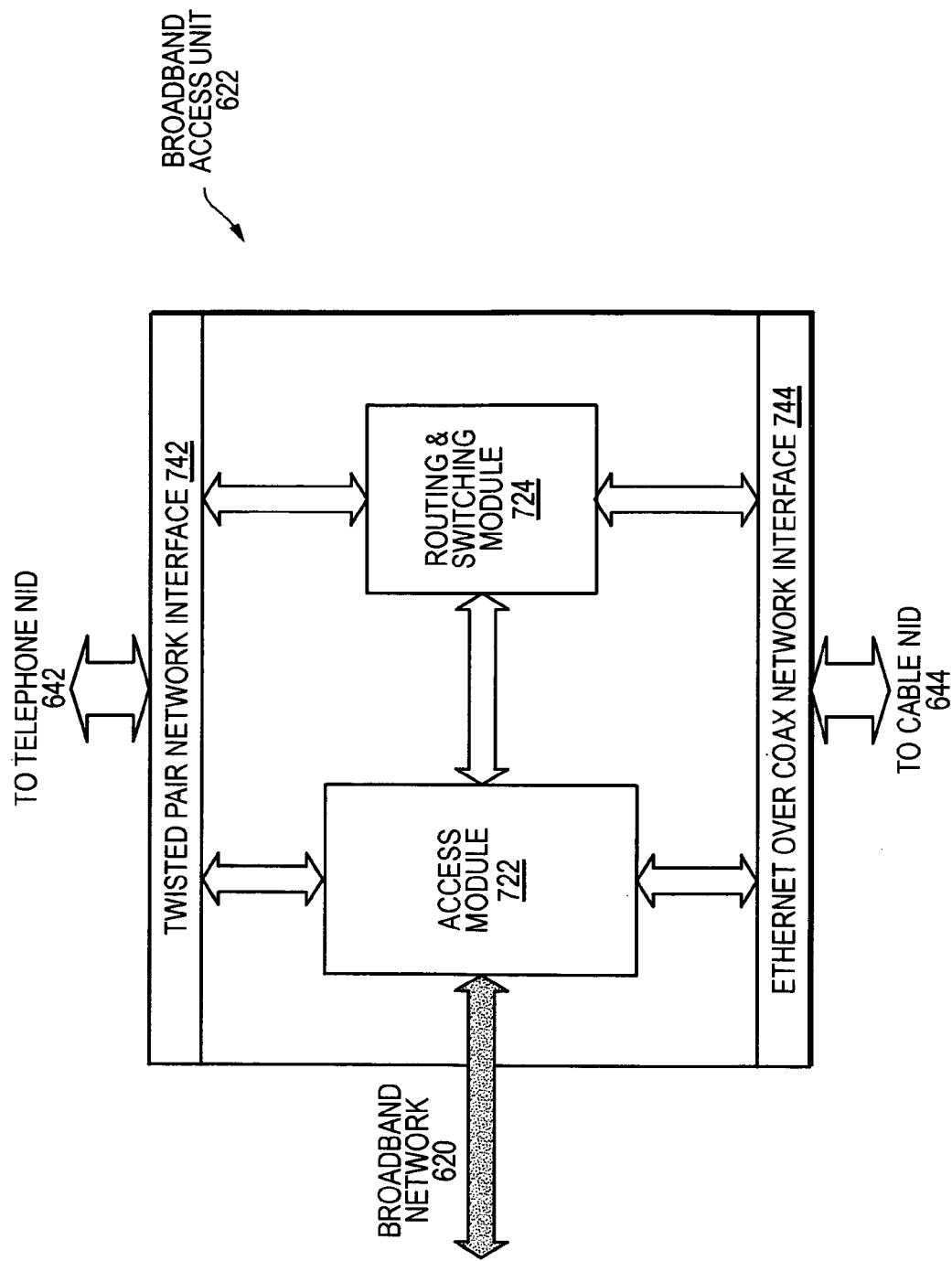
FIG. 7 includes a block diagram of a particular embodiment of the broadband access unit of FIG. 6.

FIG. 7 includes a block diagram of the BAU 622 in accordance with one embodiment. The BAU 622 can include a broadband access module 722, a routing and switching module 724, a twisted pair network interface module 742, and an Ethernet over coaxial cable network interface module 744. The access module 722 is bi-directionally coupled to each of the broadband network 620, a routing and switching module 724, the twisted pair network interface module 742, and the Ethernet over coaxial cable network interface module 744. The routing and switching module 724 is bi-directionally coupled to the twisted pair network interface module 742 and the Ethernet over coaxial cable network interface module 744. The twisted pair network interface module 742 is bi-directionally coupled to the telephone NID 742, and the Ethernet over coaxial cable network interface module 744 is bi-directionally coupled to the cable NID 644. One example of the twisted pair network interface module 742 includes HPNA V3, and one example of the Ethernet over coaxial cable network interface module 744 includes MoCA.

In one embodiment, all of the modules within the BAU 622 can be designed as pluggable and changeable modules. Therefore, more, fewer, or different modules could be used as new broadband transmission technologies are developed. In addition, the BAU 622 can be designed for different access technologies, such as ADSL, ADSL 2+, VDSL, any other copper-based or fiber-based broadband access technologies, or any combination thereof.

The routing and switching module 724 can provide one or more functionalities, such as Network Address Translation (NAT), firewall, packet switching and routing, and can allow internetworking (bridging) between IP devices that are connected to a coaxial cable and the set of twisted pair wires.

The twisted pair network interface 742 allows the BAU 622 to transport and distribute the broadband content over one or more twisted pair networks inside the structure 100. As an example, currently, HPNA V3 could be implemented in this module. In order to be able to use future networking technologies over sets of twisted pair wires, this module can be a changeable and pluggable device.

The Ethernet over coax network interface module 744 allows the BAU 622 to transport and distribute the broadband content over the existing coaxial wiring inside the structure 100. As an example, currently, the MoCA Ethernet over coaxial cable technology can be used for the module 744. Some flexibility is allowed because a modular approach can be used for this network interface as well.

With this architecture, every cable and telephone outlet inside the structure 100 is made "Ethernet-ready". IP enabled devices such as, PCs, IP STBs, and IP telephone(s) with the appropriate external or internal network interface, could be connected to any telephone or cable outlet inside the structure 100. With this architecture Ethernet is distributed from the side of the structure 100 using existing wiring to all phone and cable outlets inside the structure 100.

Figure 8:
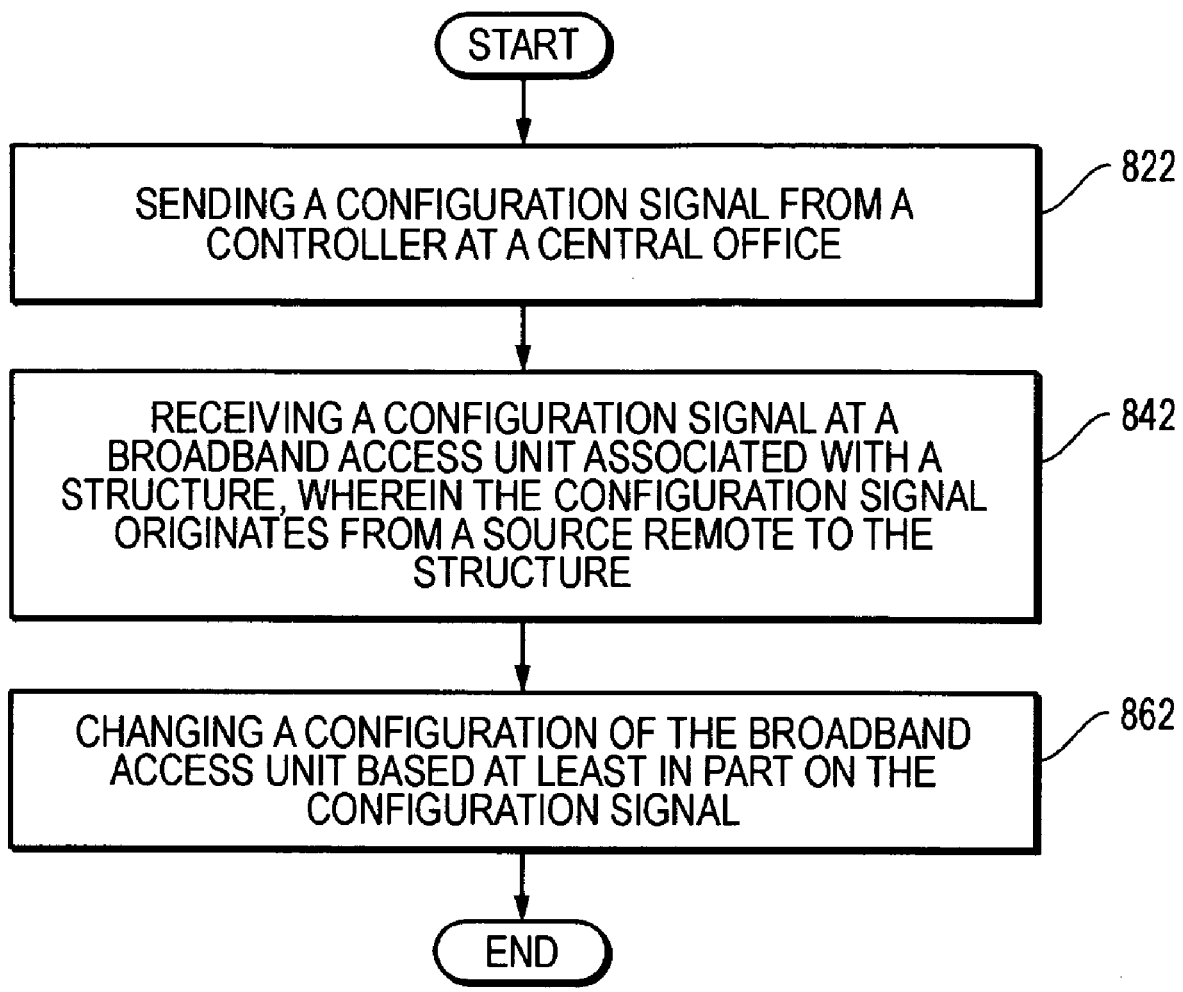
FIG. 8 includes a flow diagram of a method of using the broadband access unit of FIG. 7.

The BAU 622 can be used by any one or more of the electronic devices within the structure 100 as previously described. In addition, the BAU 622 can be designed to be configured by a broadband service provider at a remote location, such as the central office 600. A method of using the BAU 622 in accordance with an embodiment involving configuration is illustrated in FIG. 8. In one embodiment, the controller 602, which in embodiment can be a data processing system, can control the configuration of the BAU 622. The method can include sending a configuration signal from the controller 602 at the central office 600, at block 822. The configuration signal can be a digital signal, an analog signal, an electronic signal, an optic signal, or any combination thereof. The configuration signal can originate from the controller 602 that is a source remote to the structure 100. The configuration signal is transmitted over the broadband network 620. The method can also include receiving the configuration signal at the BAU 622 that is associated with the structure 100. The method can further include changing a configuration of the BAU 622 based at least in part on the cofiguration signal, as block 862.

Changing the configuration can include activating a network interface or deactivating the network interface. For the purposes of this specification, activating and deactivating provides the ability for electronic devices coupled within the structure to selectively allow broadband access. When a network interface is active, an electronic device can access broadband content through that network interface, and when the network interface is deactivated, the electronic device cannot access broadband content through that network interface. The network interface may be operational and working and still be deactivated. This can occur when the network interface is on but had received a configuration signal from the controller 602 for that particular network interface for deactivation. The network interface can remain on, so that if the controller 602 activates the network interface, the network interface can respond and activate the network interface for broadband access.

In one particular embodiment, the twisted pair network interface 642 may be activated or deactivated by sending the appropriate configuration signal from the controller 602 to the BAU 622. Similarly, the Ethernet over coax network interface 644 may be activated or deactivated by sending the appropriate configuration signal from the controller 602 to the BAU 622. In other embodiment, other signals (configuration or otherwise) can be sent from the controller 602 to the BAU 622 to allow better control, maintenance, software updates, or other actions to be taken by a broadband service provider (e.g., at the central office) in providing high quality service to a customer at the structure 100. Additionally, the broadband service provider can save costs by performing actions remotely rather than dispatching a technician to make a service call to the structure 100.

After reading the specification, skilled artisans will appreciate that still other embodiments are possible. As technology advances and new wireline media are created and developed, the communications gateways can be modified to take advantage of such new wireline media.

Note that not all of the activities described above in the general description or the examples are required, that a portion of a specific activity may not be required, and that one or more further activities may be performed in addition to those described. Still further, the order in which activities are listed are not necessarily the order in which they are performed.

Any one or more benefits, one or more other advantages, one or more solutions to one or more problems, or any combination thereof have been described above with regard to one or more particular embodiments. However, the benefit(s), advantage(s), solution(s) to problem(s), or any element(s) that may cause any benefit, advantage, or solution to occur or become more pronounced is not to be construed as a critical, required, or essential feature or element of any or all the claims.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A communications gateway, comprising:
   an input/output port to receive an input signal from a first twisted pair of wires from a source external to a building housing the communications gateway;
   a switch that includes a first selectable switch position associated with an analog telephone and a second selectable switch position associated with a voice over internet protocol (VoIP) telephone;
   a combining module;
   an analog telephone adapter to receive the input signal from the input/output port, to separate a first voice signal from the input signal, and to route the first voice signal through the combining module to a second twisted pair of wires for distribution to one or more locations within the building when the first selectable switch position is selected;
   a coaxial cable adapter to receive the input signal from the input/output port, to separate a data signal from the input signal and to separate a second voice signal from the input signal, to route the data signal to a coaxial cable for distribution to one or more locations within the building, and to route the second voice signal to the combining module; and
   a firewall module between the input/output port and the analog telephone adapter and the coaxial cable adapter, the firewall module to protect one or more devices coupled to the second twisted pair of wires and one or more devices coupled to the coaxial cable,
   wherein the combining module comprises:
      a first input to receive the second voice signal from the coaxial cable adapter; and
      a second input to receive a second signal, wherein the second signal includes the first voice signal when the first selectable switch position is selected, and wherein the second signal includes the input signal when the second selectable switch position is selected;
   wherein the combining module is operable to combine the second voice signal and the second signal to generate a combined signal and to couple the combined signal to the second twisted pair of wires, and
   wherein when the second selectable switch position is selected, the input signal bypasses the analog telephone adapter and the firewall module.

2. The communications gateway of claim 1, further comprising an Ethernet adapter to couple the input signal from the input/output port to an Ethernet connection.

3. The communications gateway of claim 1, further comprising a fiber optic cable adapter to couple the input signal from the input/output port to an optical fiber.

4. The communications gateway of claim 1, further comprising:
a modem between the input/output port and the firewall module to process the input signal from the input/output port.

5. The communications gateway of claim 1, further comprising a modem coupled to the input/output port to process the input signal carried by the first twisted pair of wires.

6. The communications gateway of claim 1, further comprising a power line adapter to receive the input signal from the input/output port and to couple the input signal to a power line of the building.

7. A method comprising:
receiving an input signal from a first twisted pair of wires;
separating a first voice signal from the input signal;
separating a second voice signal from the input signal and routing the second voice signal to a combining module;
separating a data signal from the input signal and routing the data signal to a coaxial cable for distribution to one or more locations within a building;
receiving a selection, at a switch, of one of the input signal from the first twisted pair of wires and the first voice signal separated from the input signal;
routing a switch output from the switch to the combining module to combine the switch output with the second voice signal separated from the input signal to produce a combining module output; and
routing the combining module output to a second twisted pair of wires for distribution to one or more locations within the building,
wherein when the input signal from the first twisted pair of wires is selected via the switch, an analog telephone a firewall module are bypassed, wherein the firewall module protects one or more devices coupled to the second twisted pair of wires and one or more devices coupled to the coaxial cable.

* * * * *